(12) United States Patent
Anapolle (10) Patent No.: US 10,893,693 B1
(45) Date of Patent: Jan. 19, 2021

(54) FOOD AND BEVERAGE SWEETENER, DRIED APPLE SWEETENER, AND SWEETENER WITH APPLE PEEL

(71) Applicant: Ross Anapolle, Newton, MA (US)

(72) Inventor: Ross Anapolle, Newton, MA (US)

( * ) Notice: Subject to any disclaimer, the term of this patent is extended or adjusted under 35 U.S.C. 154(b) by 0 days.

(21) Appl. No.: 15/720,687

(22) Filed: Sep. 29, 2017

Related U.S. Application Data

(60) Provisional application No. 62/401,768, filed on Sep. 29, 2016, provisional application No. 62/407,192, filed on Oct. 12, 2016, provisional application No. 62/407,219, filed on Oct. 12, 2016.

(51) Int. Cl.
| | |
|---|---|
| *A23L 27/12* | (2016.01) |
| *A23G 3/48* | (2006.01) |
| *A23L 27/29* | (2016.01) |
| *A23L 27/30* | (2016.01) |

(52) U.S. Cl.
CPC ............... *A23L 27/12* (2016.08); *A23G 3/48* (2013.01); *A23L 27/29* (2016.08); *A23L 27/30* (2016.08); *A23V 2002/00* (2013.01)

(58) Field of Classification Search
CPC .......... A23L 27/12; A23L 27/29; A23L 27/30
USPC .............................................. 426/615, 330.3
See application file for complete search history.

(56) References Cited

U.S. PATENT DOCUMENTS

| | | | |
|---|---|---|---|
| 5,534,280 A | * | 9/1996 | Welch |
| 8,551,554 B2 | * | 10/2013 | Liu et al. |
| 2004/0265451 A1 | * | 12/2004 | Rooks et al. |
| 2009/0110789 A1 | * | 4/2009 | Mower et al. |

FOREIGN PATENT DOCUMENTS

CN 105613871 A * 6/2016

OTHER PUBLICATIONS http://jenniferskitchen.com/2011/12/how-to-dry-apples.html/cookbook-print/22590, p. 1. (Year: 2011).*
Pitts et al. 2008 "Effect of baking on dietary fibre and phenolics of muffins incorporated with apple skin powder", Food Chemistry, vol. 107, Issue 3, Apr. 2008, pp. 1217-1224. (Year: 2008).*

* cited by examiner

*Primary Examiner* — Helen F Heggestad
(74) *Attorney, Agent, or Firm* — Onello & Mello, LLP (57) ABSTRACT

In accordance with aspects of the present invention, provided is an apple peel sweetener that can be used as an ingredient or condiment for food and beverages. The combination of dried apple peel powder and dried apple flesh or other sweetener can serve as a substitute for sugar or artificial sweeteners, as examples. The apple sweetener can provide improved health benefits, including a lower glycemic index when compared to other sweeteners.

18 Claims, 7 Drawing Sheets

FOOD AND BEVERAGE SWEETENER, DRIED APPLE SWEETENER, AND SWEETENER WITH APPLE PEEL

CROSS REFERENCES TO RELATED APPLICATIONS

This application claims benefit of U.S. Provisional Application No. 62/401,768, filed on Sep. 29, 2016, entitled FOOD AND BEVERAGE SWEETENER; U.S. Provisional Application No. 62/407,192 filed Oct. 12, 2016, entitled DRIED APPLE SWEETENER; and U.S. Provisional Application No. 62/407,219, filed on Oct. 12, 2016, entitled SWEETENER WITH APPLE PEEL, which are hereby incorporated by reference in their entireties.

FIELD OF INTEREST

The present inventive concepts relate to the field of sweeteners as food and beverage ingredients, in particular, the present invention relates to sweeteners including apple or other fruit byproducts, such as sweeteners including apple peel powder.

SUMMARY

In accordance with one aspect of the present disclosure, provided is an apple sweetener, comprising dried apple peel powder and a freeze-dried apple powder.

In accordance with another aspect of the present disclosure, provided is an apple sweetener product, comprising dried apple peel powder in a first amount and freeze-dried apple powder in a second amount combined into a single powder with the dried apple peel powder.

In various embodiments, the apple peel powder can comprise Polyphenols/Total Antioxidant Activity of ≥3.00%.

In accordance with another aspect of the present disclosure, provided is an apple sweetener comprising dried apple powder, referred to as dried apple sweetener.

In various embodiments, the dried apple sweetener can include dried apple flesh, dried apple peel, or a combination of the two.

In various embodiments, the dried apple sweetener is fully or at least partially dissolvable or soluble in liquids, such as hot or cold coffee or tea, as examples.

In various embodiments, the dried apple sweetener can be provided in packets, similar to sugar, or in bulk (e.g., a 5 pound bag).

In various embodiments, the dried apple sweetener can be provided as an ingredient used in food or beverage recipes, e.g., as a healthy replacement for sugar or other such sweeteners.

In various embodiments, the dried apple sweetener can be a dried apple powder that is freeze dried, drum dried, and/or air dried.

In accordance with another aspect of the present disclosure, provided is sweetener comprising apple peel powder, which can be a dried apple peel powder, referred to as an apple peel sweetener.

In various embodiments, the apple peel powder can comprise Polyphenols/Total Antioxidant Activity in the amount of ≥3.00%.

In various embodiments, the apple peel powder can comprise Pectin in the amount of ≥13.00%.

In various embodiments, the apple peel powder can comprise Soluble Fiber in the amount of ≥14.00%.

In various embodiments, the another dried fruit can be used in place of or in addition to dried apple or dried apple peel powder for making the various sweeteners disclosed herein, which can be or include dried grape, dried cranberry, dried raspberry, dried pomegranate, dried blueberry, dried blackberry, or other dried fruits.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Food and Beverage Sweetener

In accordance with aspects of the present invention, provided is an apple-based food and beverage sweetener comprising dried apple peel powder and freeze-dried apple, which can also be a powder. In other embodiments, the apple powder could be combined with apple flesh in another form, such as in the form of a juice, concentrate, extract, cider, syrup or other liquid. The mixture, with dried apple peel powder added can remain in liquid form or, optionally, be dried or crystallized to form sweetener as a solid, which could be packetized.

Figure 1:
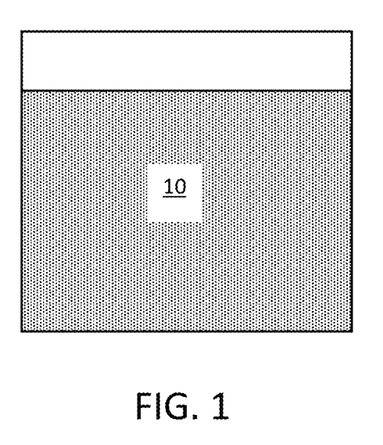
FIG. 1 is a front view of a container partially filled with dried apple peel powder.
Figure 2:
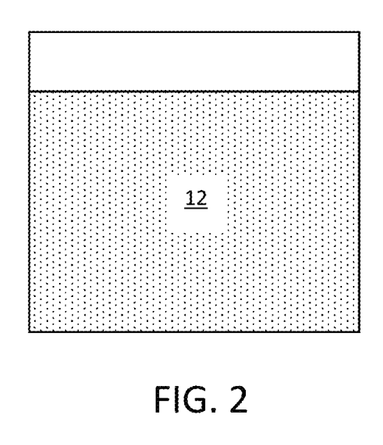
FIG. 2 is a front view of a container partially filled with a freeze-dried apple powder.
Figure 3:
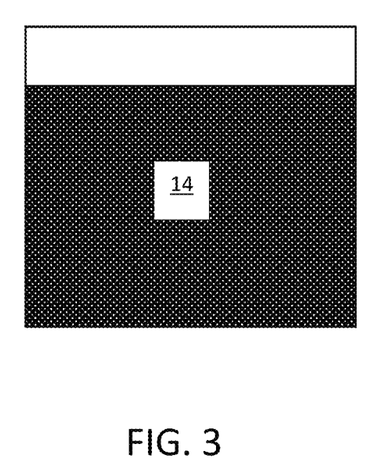
FIG. 3 is a front view of a container partially filled with an apple sweetener, in accordance with aspects of the inventive concept.

The combination of dried apple peel powder 10 (see FIG. 1) and freeze-dried apple 12 (see FIG. 2) is referred to herein as "apple sweetener" 14 (see FIG. 3). In accordance with aspects of the inventive concept, the apple sweetener can be used as a condiment, such as for adding to a hot or cold beverage or food. The apple sweetener serves as a healthy alternative to refined (white) sugar, organic cane sugar, turbinado sugar such as Sugar in the Raw® (a registered trademark of Cumberland Packing Corp.), and artificial sweeteners, such as Splenda® (a registered trademark of Heartland Consumer Products LLC), Equal® (a registered trademark of Merisant Company Corporation), and the like.

Various methods have been used to make apple peel powder from apple skins, such as those described in U.S. Pat. No. 8,551,554 (the '554 Patent"), the content of which are incorporated herein by reference. The '554 Patent primarily described manners of making such a powder in view of studies showing in vitro cancer fighting benefits. For therapeutic purposes, the '554 Patent described making the apple peel powder to have an unusually high phenolic content, i.e., 3.00%. To the limited extent that uses of such a powder were disclosed in the '554 Patent, they were limited to treating and inhibiting the proliferation of liver cancer cells.

Leahy Orchards Inc. of Canada produces an organic dried apple peel powder under the tradename AppleActiv DAPP™. Some of the significant characteristics of AppleActiv DAPP™ are: high phenolic and flavonoid content, rich in antioxidants, enzymes, vitamins and minerals; and provide clinically supported health benefits. The dried apple peel powder is a fine powder.

Freeze-dried apples in powder form is also presently available for purchase, as are apple concentrates, ciders, juices, and so on. Freeze-dried apples are customarily made from the apple flesh, and not the skin (or peel). The peel is often treated as waste and discarded. Like the dried apple peel powder, the freeze-dried apple powder can be a fine powder.

Dried apple peel powder (made from apple skins) has extremely high nutritional content, but a very mild apple taste. Freeze-dried apple powder (made from apple flesh) has much less nutritional content, but has a much sweeter taste. By combining dried apple peel powder with freeze-dried apple powder, the apple is reconstituted in a sense, in that consumer receives the apple skin and the apple flesh, as ideally provided in nature. The combination can be referred to as a "whole apple sweetener."

An apple sweetener in accordance with aspects of the inventive concept combines dried apple peel powder, with its nutrients, and freeze-dried apple powder, with its sweetness, to form a single powder sweetener having both nutritional value and sweetness. In other embodiments, the sweetener could take the form of crystals or a liquid. In accordance with aspects of the inventive concept, the apple sweetener has a very low glycemic index, which is extremely important for those with conditions such as diabetes. This is significantly distinguished from traditional sweeteners, such as those mentioned above.

The apple sweetener can be used as a condiment, e.g., like sugar, that can be added to tea, coffee, smoothies and the like. The apple sweetener can be used as topping for oatmeal, salads, vegetables, desserts, and so forth. The apple sweetener can be used as an ingredient such as a baking ingredient, e.g., as a sugar substitute in a variety of recipes or off the shelf products. As a baking ingredient, for example, the apple sweetener can lower the glycemic index of the baked goods—owing to the benefits of the dried apple peel powder. Therefore, the apple sweetener can be used to improve a wide variety of products, which can include, but are not limited to, yogurts, cereals, sauces, baked goods, and/or beverages.

Different ratios of dried apple peel powder and freeze-dried apple can be used. The greater the proportion of freeze-dried apples, the sweeter the apple sweetener, but the less its nutritional value. In some preferred forms, a 50/50 ratio is preferred. But such a ratio is by no means limiting of the inventive concept. A ratio of 90% freeze dried apple powder with 10% dried apple peel powder has been made and used as a condiment in testing by the inventor. In short, various ratios can be used, depending on the nutrition versus sweetness balance desired. In any combination, an apple sweetener in accordance with aspects of the inventive concept can be an all-natural, organic alternative, with low glycemic index, to traditional sugars and artificial sweeteners.

Another benefit of the apple sweetener is that, if provided as a fine powder, it does not tend to only partially dissolve in a liquid, leaving an abundance of the product undissolved at the bottom of a cup, such as tends to happen with turbinado. The apple sweetener can be provide in packets, jars, cans, or bulk.

Dried Apple Sweetener

In accordance with aspects of the present invention, provided is a dried apple sweetener comprising dried apple flesh, dried apple peel, or a combination thereof. The dried apple sweetener can take the form of a dried apple powder, which can be at least partially soluble. In other embodiments, the dried apple sweetener can take the form of a liquid into which a soluble dried apple powder can be added, e.g., and at least partially dissolved. In some embodiments, the liquid with dried apple powder can then be crystallized to generate the dried apple sweetener in the form of dried apple crystals. Dried apple powder can be formed by freeze drying, drum drying, and/or air drying, or other drying methods.

Figure 4:
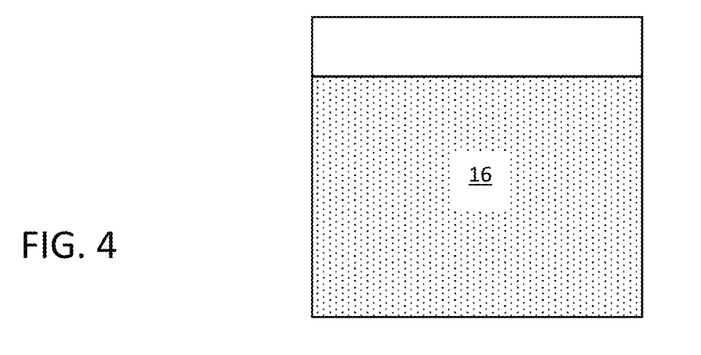
FIG. 4 is a front view of a container partially filled with dried apple sweetener, e.g., in the faun of a bulk powder.

FIG. 4 shows a container partially filled with dried apple sweetener 16, in accordance with aspects of the present invention. For example, the dried apple sweetener 16 can take the form of the sweetener 14 described above with respect to FIGS. 1-3. The dried apple sweetener 16 can be in a bulk dry form. In other embodiments, the sweetener 16 could be provided in a liquid form. For example, in a liquid form, a dried apple powder can be added to a liquid and, for example, at least partially dissolved therein. Subsequently, the liquid could then be dried or crystallized to form a dried apple sweetener, such as dried apple sweetener 14 or 16.

Figure 5:
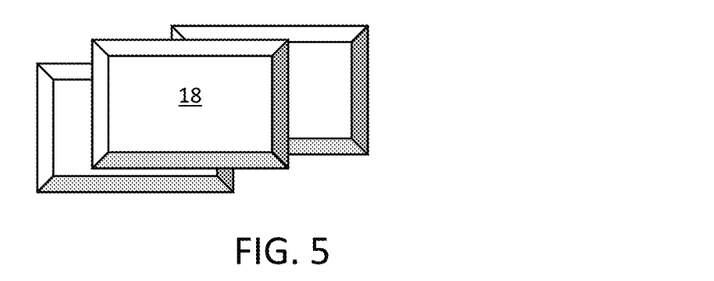
FIG. 5 is a front view of packets of dried apple sweetener.

FIG. 5, on the other hand, shows packets 18 of dried apple sweetener 16. As an example, each packet can contain about a teaspoon of dried apple sweetener 16. In other embodiments, the packet 18 can contain more or less of the dried apple sweetener 16. The dried apple sweetener 16 can be provided in powder of liquid form, as examples.

In other embodiments, the apple sweetener 16 could take a liquid form contained by the packets 18.

The apple sweetener 16 can be used as a condiment, such as for adding to a cold beverage 20 (FIG. 6A), a hot beverage 22 (FIG. 6B), or a food. As discussed above, the apple sweetener 16 serves as a healthy alternative to refined (white) sugar, organic cane sugar, turbinado sugar such as Sugar in the Raw® (a registered trademark of Cumberland Packing Corp.), and artificial sweeteners, such as Splenda® (a registered trademark of Heartland Consumer Products LLC), Equal® (a registered trademark of Merisant Company Corporation), and the like.

Figure 6A:
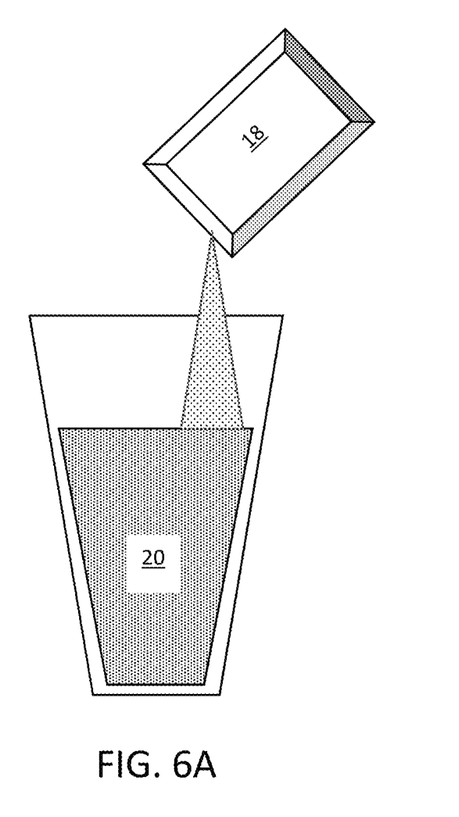
FIG. 6A is a front view of a glass partially filled with a cold beverage having a packet of dried apple sweetener added, in accordance with aspects of the inventive concept.
Figure 6B:
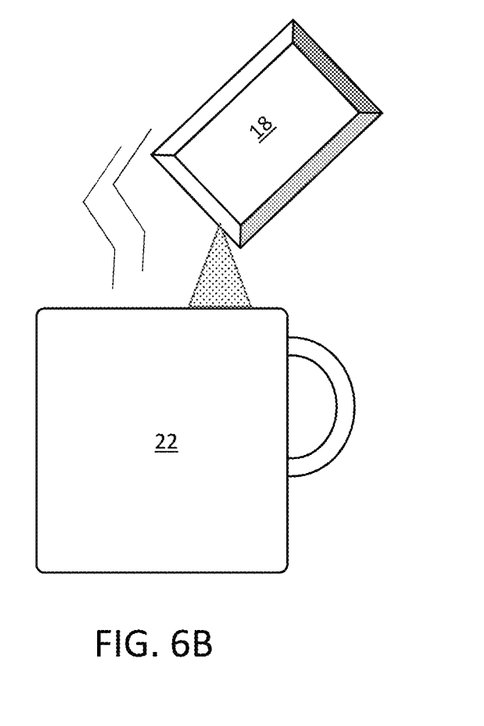
FIG. 6B is a front view of a mug partially filled with a hot beverage having a packet of dried apple sweetener added, in accordance with aspects of the inventive concept.

FIG. 6A shows a packet 18 of dried apple sweetener 16 being added to a cold beverage 20, e.g., iced tea or iced coffee. FIG. 6B shows a packet 18 of dried apple sweetener 16 being added to a hot beverage 22, such as a hot tea or hot coffee. In either case, the dried apple sweetener 16 can be provided in an at least partially soluble dry form, in preferred embodiments. But in other embodiments, the dried apple sweetener can be provided in a liquid form, e.g., where dried apple has been at least partially dissolved into a liquid.

Dried apples in powder form are presently available for purchase, but it is not used as a sweetener or sold in packets like traditional sugar. Dried apples are customarily made from the apple flesh, and not the skin (or peel). As an example, such dried apple powder can come in the form of a fine powder.

Dried apple sweetener 16 in accordance with aspects of the inventive concept provides both nutritional value and sweetness. In accordance with aspects of the inventive concept, when the dried apple sweetener includes dried apple peel, the dried apple sweetener will have a low glycemic index. This is extremely important for those with conditions such as diabetes. This is significantly distinguished from traditional sweeteners, such as those mentioned above.

As discussed above, the dried apple sweetener can be used as a condiment, e.g., like sugar, that can be added to tea, coffee, smoothies and the like (e.g., See FIGS. 6A-B). The dried apple sweetener 16 can be used as topping for oatmeal, salads, vegetables, desserts, and so forth. The dried apple sweetener can be used as an ingredient, e.g., as a sugar substitute, in a variety of recipes or off-the-shelf products. Such off-the-shelf products can include, but are not limited to, yogurts, cereals, sauces, baked goods, and/or beverages.

Sweetener with Apple Peel

In accordance with aspects of the present invention, provided is an apple peel sweetener comprising a sweetener and dried apple peel, which can take the form of a powder (or dried apple peel powder). The combination of dried apple peel powder 10 (see FIG. 7) and sweetener 24 (see FIG. 8) is a sweetener with dried apple peel powder, referred to herein as apple peel sweetener 26 (see FIG. 9). Sweeteners 14 and 16 discussed above can be apple peel sweeteners 26.

Figure 10:
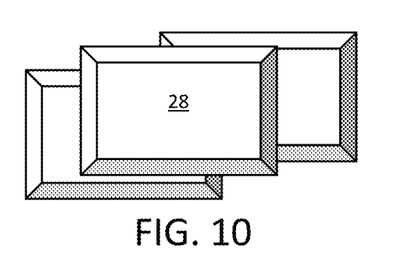
FIG. 10 is a front view of packets of the apple peel sweetener.
Figure 11A:
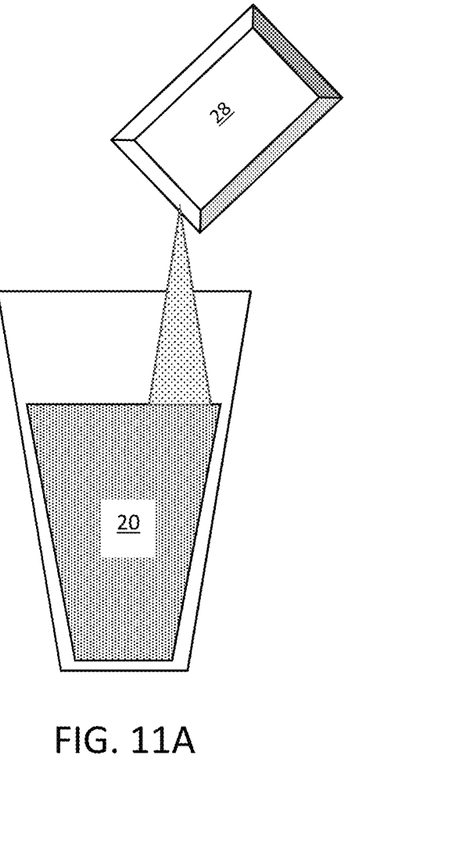
FIG. 11A is a view of a glass partially filled with a cold beverage to which a packet of the apple peel sweetener is being added.
Figure 11B:
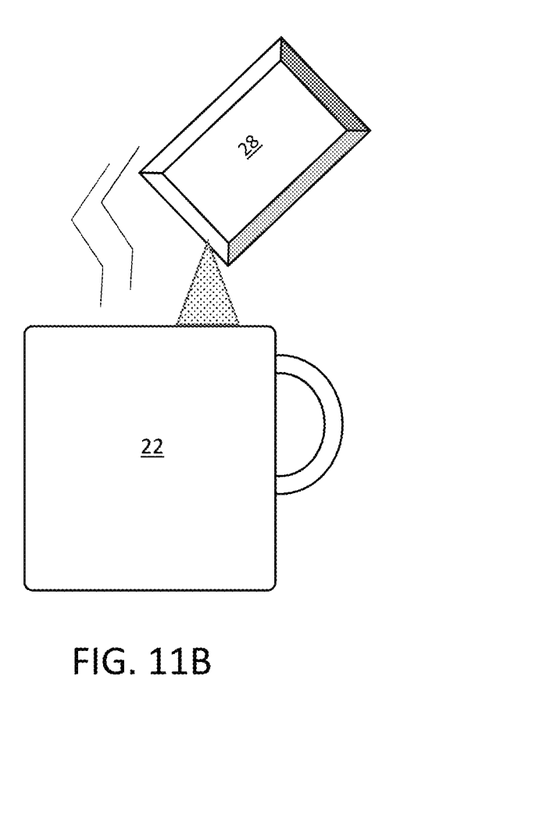
FIG. 11B is a view of a mug partially filled with a hot beverage to which a packet of the apple peel sweetener is being added.

In accordance with aspects of the inventive concept, the apple peel sweetener can be used as a condiment, such as for adding to a hot or cold beverage or food. (See FIGS. 10, 11A and 11B)

Various methods have been used to make apple peel powder from apple skins, such as the methods for making dried apple peel powder described in U.S. Pat. No. 8,551,554 (the '554 Patent"), the content of which are incorporated herein by reference. The benefits of dried apple peel powder, e.g., AppleActiv DAPP™ by Leahy Orchards Inc. of Canada, are discussed above. In various embodiments, the dried apple peel powder is a fine powder.

In the preferred embodiments, the dried apple peel powder can comprise Pectin in the amount of ≥13.00%, and Soluble Fiber in the amount of ≥14.00%. The dried apple peel powder can also comprise Polyphenols/Total Antioxidant Activity in the amount of ≥3.00%. The relatively high amounts of Pectin and Soluble Fiber have the effect of slowing down the transport of glucose from the sweetener to the body. Therefore, the addition of the dried apple peel powder to the sweetener results in a sweetener that has a relatively low glycemic index as compared to the sweetener by itself. Said differently, the addition of dried apple peel powder to the sweetener results in a sweetener having a reduced glycemic index.

The sweetener can be, as examples, refined (white) sugar, organic cane sugar, turbinado sugar such as Sugar in the Raw® (a registered trademark of Cumberland Packing Corp.), and the like. Combining the dried apple peel powder with any of the foregoing, e.g., Sugar in the Raw, reduces the glycemic index of the sweetener. The sweetener could also be or include other fruit powders, extracts, syrups, juices, concentrates, and so on.

Figure 7:
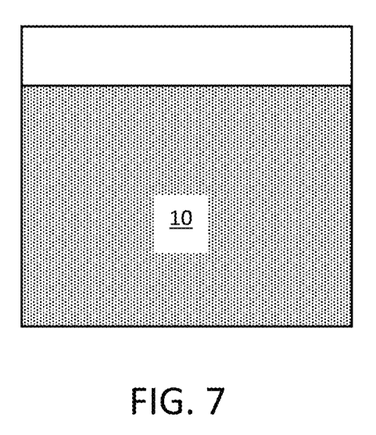
FIG. 7 is a front view of a container partially filled with dried apple peel powder.
Figure 8:
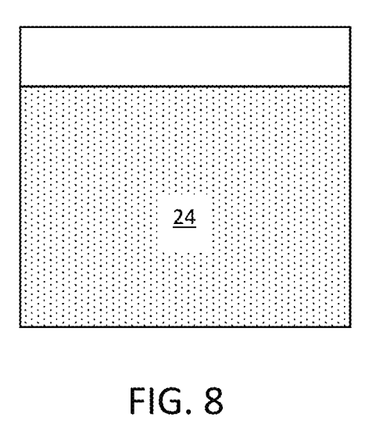
FIG. 8 is a front view of a container partially filled with a sweetener.
Figure 9:
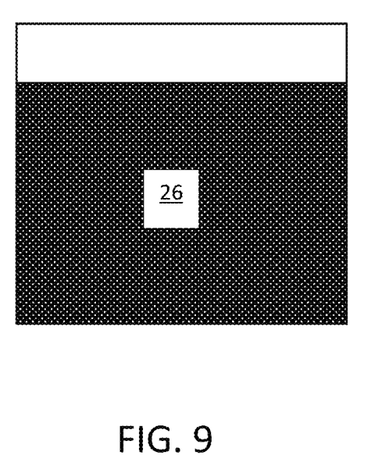
FIG. 9 is a front view of a container partially filled with a sweetener with dried apple peel powder, or apple peel sweetener, in accordance with aspects of the inventive concept.

Dried apple peel powder 10 (e.g., made from apple skins) has extremely high nutritional content, but a very mild apple taste. Sweetener 24 has much less nutritional content, but has a much sweeter taste. By combining dried apple peel powder 10 with the sweetener 24 to form the apple peel sweetener 26, the taste of the sweetener 24 is not compromised while it nutritional value and health benefits are increased. In accordance with aspects of the inventive concept, the apple peel sweetener 26 has a very low glycemic index, which is extremely important for those with conditions such as diabetes. This is significantly distinguished from traditional sweeteners alone, such as those mentioned above.

The apple peel sweetener 26 can be used as a condiment, e.g., like sugar, that can be added to tea, coffee, smoothies and the like. The apple peel sweetener 26 can be used as topping for oatmeal, salads, vegetables, desserts, and so forth. The apple peel sweetener 26 can be used as an ingredient, e.g., as a sugar substitute, in a variety of recipes or in off-the-shelf products. Such off-the-shelf products can include, but are not limited to, yogurts, cereals, sauces, baked goods, and/or beverages.

Different ratios of dried apple peel powder 10 and sweetener 24 can be used. The greater the proportion of sweetener 24, the sweeter the apple sweetener 26, but the less its nutritional value. In some embodiments, the ratio of dried apple peel powder 10 to sweetener 24 is about 50/50 or less. In some embodiments, the ratio of dried apple peel powder 10 to sweetener 24 is about 20/80 or less. In some embodiments, a 10/90 ratio or a 5/95 ratio of dried apple peel powder 10 to sweetener 24 is provided. The inventive concept is not, however, limited to these ratios. In short, various ratios can be used, depending on the nutrition versus sweetness balance desired. In any combination, an apple peel sweetener 26 in accordance with aspects of the inventive concept can be a low glycemic index alternative to traditional sugars and artificial sweeteners.

In some embodiments, other ingredients could also be added to the apple peel sweetener 26, such as dried apple powder made from the flesh of the apple, other fruit powders, protein powders, or other powders or products.

Method of Making a Fruit Sweetener

Figure 12:
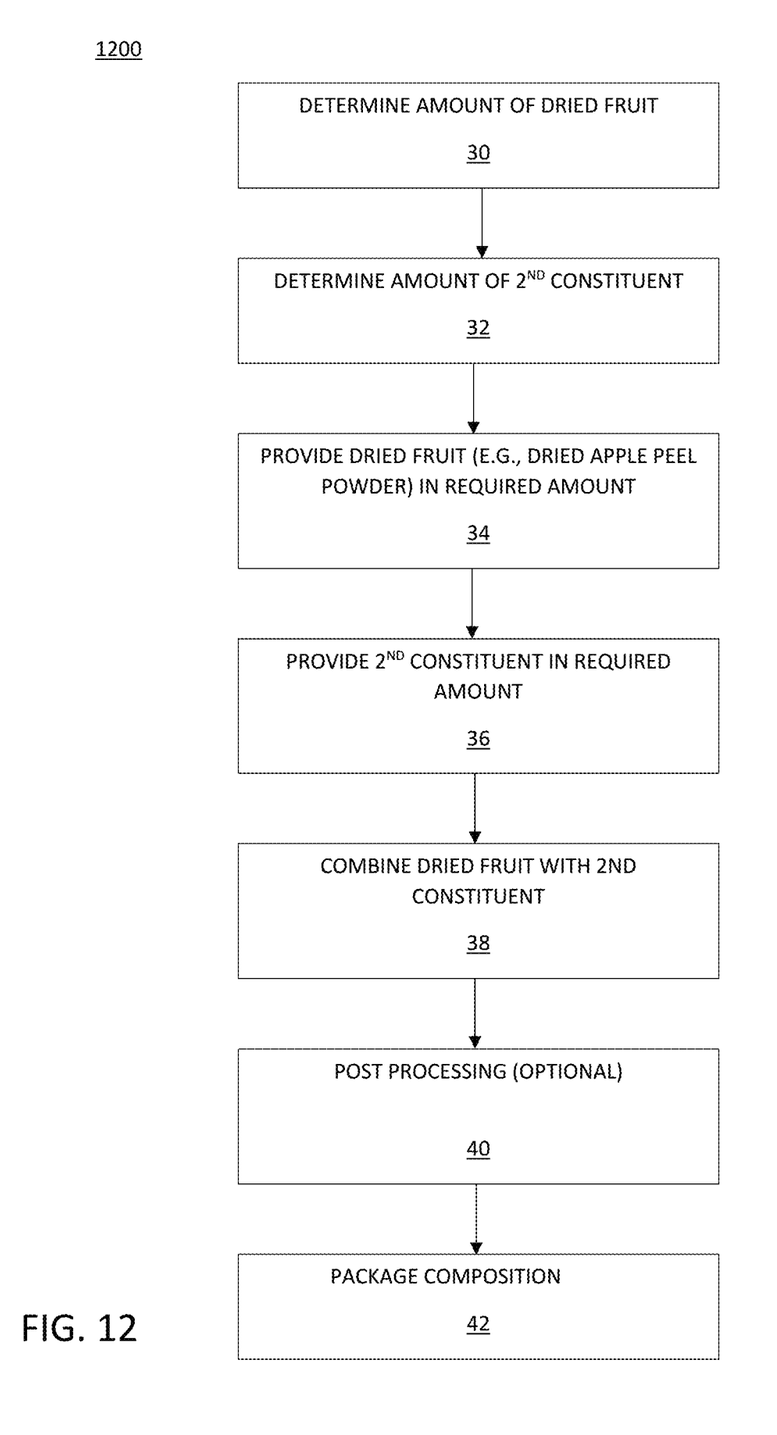
FIG. 12 is a flowchart depicting an embodiment of a method of making an apple sweetener, in accordance with aspects of the inventive concepts.

FIG. 12 is a flowchart depicting an embodiment of a method 1200 of making an apple sweetener, in accordance with aspects of the inventive concepts. In step 30, an amount of dried fruit is determined to achieve a desired sweetener composition, such as sweeteners 14, 16, and 26. The dried fruit can be a dried apple peel powder, dried apple, or some other dried fruit or fruit skin or peel, depending on the desired sweetener composition.

In step 32, an amount of a $2^{nd}$ constituent is determined to make the intended sweetener composition. The $2^{nd}$ constituent could be freeze dried apple, sugar, or a known sugar substitute, as examples. In various embodiments, additional constituents could similarly be included, such as other dried fruits or sweeteners. In step 34, the determined amount of dried fruit is provided and, in step 36, a determined amount of the $2^{nd}$ constituent is provided. These are the determined amounts to make the intended sweetener composition.

In step 38, the determined amounts of dried fruit (e.g., dried apple peel) and the $2^{nd}$ constituent are mixed, blended, or otherwise combined to form the intended sweetener composition, e.g., an apple sweetener.

In step 40, of the combination took a liquid form because, e.g., if the $2^{nd}$ constituent was a liquid or if a liquid was used in the combining step, the sweetener composition could be dried using any of the drying processes discussed above, as examples. Step 40 is optional, since in some cases it may be intended to produce the sweetener composition as a liquid and in other cases the combining in step 38 may yield a powder.

In step 42, the sweetener composition can be packaged, e.g., as packets or bulk sweetener composition.

Fruit Sweetener Production System

Figure 13:
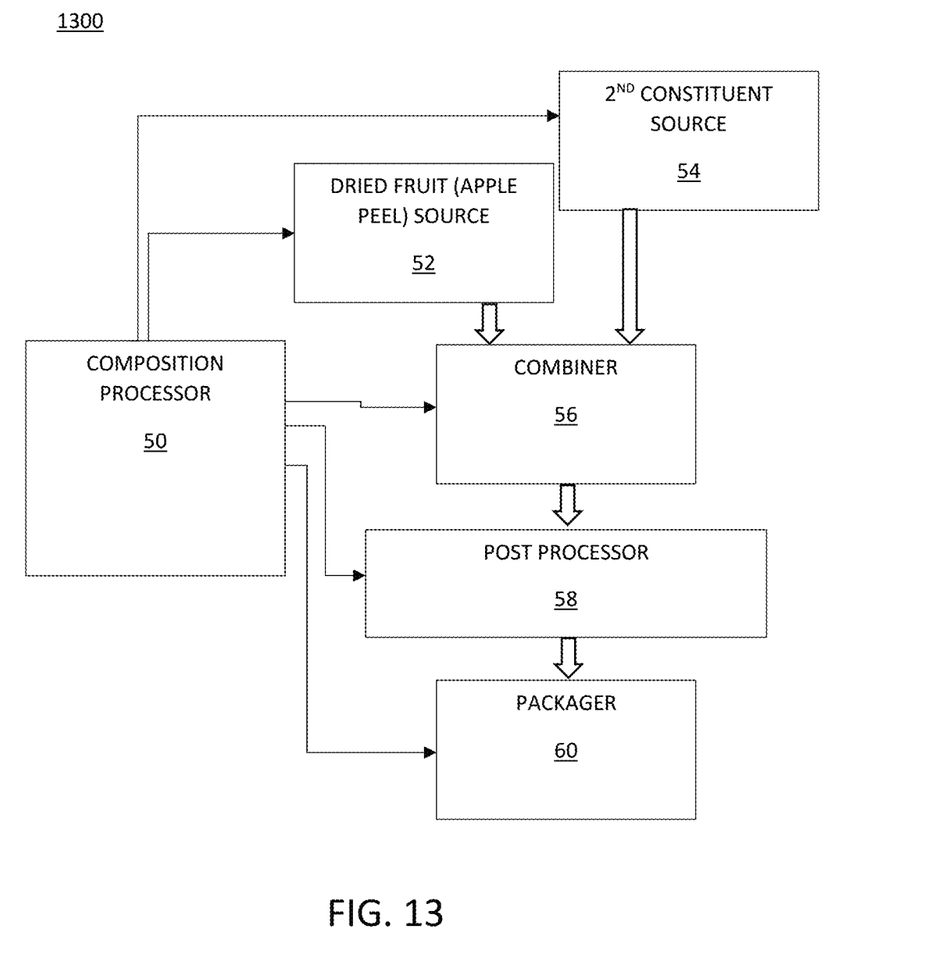
FIG. 13 is a block diagram of an embodiment of apple sweetener production system, in accordance with aspects of the inventive concepts.

FIG. 13 is a block diagram of an embodiment of apple sweetener production system 1300, in accordance with aspects of the inventive concepts. System 1300 can be configured to implement the method 1200 of FIG. 12, or any other method disclosed herein.

The system 1300 may be under the control of at least one composition processor 50, which can include and/or have access to at least one computer processor and computer storage device. The composition processor 50 can receive inputs regarding an intended sweetener composition, and instruct and control other devices and/or subsystems within system 1300 as needed to produce the intended sweetener composition. The communication there between can be wired or wireless.

A dried fruit source 52 is a device that stores (or accesses) and delivers dried fruit in response to received instructions, such as from processor 50. Therefore, the dried fruit source 52 can include at least one tank or container of dried fruit, such as dried apple peel powder. The dried fruit source 52 can include at least one delivery system that delivers an intended amount of the dried fruit, e.g., by weight or volume.

A $2^{nd}$ constituent source 54 is a device that stores (or accesses) and delivers the $2^{nd}$ constituent in response to received instructions, such as from processor 50. Therefore, the $2^{nd}$ constituent source 54 can include at least one tank or container of $2^{nd}$ constituent, such as dried apple flesh, a sweetener, and so on (as described above). The $2^{nd}$ constituent source 54 can include at least one delivery system that delivers an intended amount of the $2^{nd}$ constituent, e.g., by weight or volume.

Combiner 56 receives the intended amounts of the dried fruit and the $2^{nd}$ constituent and combines them, e.g., by mixing, blending, or other methods. The combiner can be configured to introduce liquid or dry agents necessary or useful to facilitate the combining operation. For example, a liquid agent could be water.

A post process 58 can be provided to receive the combine dried fruit and constituent and any mixing agents and process the mixture to achieve the sweetener composition in its intended final form, e.g., as a powder, crystals, liquid, and so on.

A packager 60 can be provided to receive the sweetener composition in its intended final form and package it in its intended form of packaging, e.g., packets, bags, boxes, jars, and so on.

With respect to the method 1200 of FIG. 12 and the system 1300 of FIG. 13, dried fruit, such as dried apple peel, is indicated as a $1^{st}$ constituent in dried form. However, the method and system can be adapted to provide the fruit, e.g., apple peel, in a liquid or crystal form. The post processing can put the sweetener in its intended final form, e.g., powder, crystals, or liquid, regardless of whether the $1^{st}$ and/or $2^{nd}$ constituents were originally provided in dry or liquid form.

In various embodiments, the another dried fruit can be used in place of or in addition to dried apple or dried apple peel powder for making the various sweeteners disclosed herein, which can be or include dried grape, dried cranberry, dried raspberry, dried pomegranate, dried blueberry, dried blackberry, or other dried fruits.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

What is claimed is:

1. An apple sweetener product, comprising:
a dried apple peel powder in a first amount, the dried apple peel powder processed to have:
a Polyphenols/Total Antioxidant Activity of ≥3.00%,
Pectin in an amount of ≥13.00%, and
Soluble Fiber in an amount of ≥14.00%; and
dried apple powder in a second amount combined into a single powder with the dried apple peel powder,
wherein the first amount of dried apple peel powder is in range of about 2% to about 6% of the apple sweetener product and glycemic index of the product is not more than about 22.5.

2. A food and/or beverage sweetener composition, comprising:
a sweetener in combination with a dried apple peel powder to form a low-glycemic composition, wherein:

an amount of the dried apple peel powder is in range of about 2% to about 6% of the composition;

a polyphenol activity of the dried apple peel powder is ≥3.00%;

the dried apple peel powder has Pectin in an amount of ≥13.00%;

the dried apple peel powder has Soluble Fiber in an amount of ≥14.00%; and the composition has a glycemic index of about 22.5 or less.

3. The composition of claim 2, wherein the composition includes dried apple flesh in combination with the dried apple peel powder.

4. The composition of claim 2, wherein the composition is a powder.

5. The composition of claim 2, wherein the composition is contained within an individual packet.

6. The composition of claim 2, wherein the composition is a liquid.

7. The composition of claim 2, wherein the composition is at least partially dissolvable or soluble in liquids.

8. The composition of claim 3, wherein the dried apple flesh is freeze dried, drum dried, or air dried.

9. The composition of claim 2, wherein the sweetener is turbinado sugar.

10. The composition of claim 2, wherein the sweetener is cane sugar.

11. The composition of claim 2, wherein the sweetener is refined sugar.

12. The apple sweetener product of claim 1, wherein the dried apple peel powder is glucose free.

13. The composition of claim 2, wherein the dried apple peel powder is glucose free.

14. A sweetener product made by a process comprising the steps:

providing a sweetener; including dried apple powder processing apple peel into a dried apple peel powder to have:
- a polyphenol activity of ≥3.00%,
- Pectin in an amount of ≥13.00%,
- Soluble Fiber in an amount of ≥14.00%; and combining the sweetener and a dried apple powder and the dried apple peel powder so that the dried apple peel powder is in a range of about 2% to about 6% of the product, thereby forming the product to have a glycemic index of about 22.5 or less.

15. The product of claim 14, wherein the dried apple peel powder is substantially uniformly distributed within the product.

16. The product of claim 14, wherein the dried apple peel powder is glucose free.

17. The product of claim 14, wherein the product is a powder.

18. The product of claim 14, wherein the product is a liquid.

* * * * *